US006532225B1

(12) United States Patent
Chang et al.

(10) Patent No.: US 6,532,225 B1
(45) Date of Patent: Mar. 11, 2003

(54) MEDIUM ACCESS CONTROL LAYER FOR PACKETIZED WIRELESS SYSTEMS

(75) Inventors: Li Fung Chang, Holmdel, NJ (US); Kapil K. Chawla, Middletown, NJ (US); Justin C. Chuang, Holmdel, NJ (US); Xiaoxin Qiu, Bridgewater, NJ (US); Nelson R. Sollenberger, Tinton Falls, NJ (US)

(73) Assignee: AT&T Corp, New York, NY (US)

( * ) Notice: Subject to any disclaimer, the term of this patent is extended or adjusted under 35 U.S.C. 154(b) by 0 days.

(21) Appl. No.: 09/361,572

(22) Filed: Jul. 27, 1999

(51) Int. Cl.[7] .................................................. H04Q 7/28
(52) U.S. Cl. ...................................................... 370/341
(58) Field of Search ................................ 370/341–349, 370/331–338, 403, 294–296, 524, 525, 432, 276, 312, 478, 337, 466–468, 392; 455/12.1, 442, 434–436, 458, 426–428, 503, 403, 433, 466, 517, 552

(56) References Cited

U.S. PATENT DOCUMENTS

| | | | | |
|---|---|---|---|---|
| 5,633,868 A | * | 5/1997 | Baldwin et al. ............ | 370/331 |
| 5,697,066 A | * | 12/1997 | Acampora .................. | 370/346 |
| 5,757,813 A | * | 5/1998 | Raith .......................... | 370/468 |
| 5,799,251 A | * | 8/1998 | Paavonen .................... | 455/517 |
| 5,802,465 A | * | 9/1998 | Hamalainen et al. ....... | 455/403 |
| 5,878,036 A | * | 3/1999 | Spartz et al. ............... | 370/335 |
| 5,896,561 A | * | 4/1999 | Schrader et al. ............ | 370/445 |
| 5,910,949 A | * | 6/1999 | Bilstrom et al. ............ | 370/337 |
| 5,917,810 A | * | 6/1999 | De Bot ....................... | 370/294 |
| 5,953,323 A | * | 9/1999 | Haartsen ..................... | 370/330 |
| 6,061,549 A | * | 5/2000 | Labonte et al. ............. | 455/552 |
| 6,094,421 A | * | 7/2000 | Scott .......................... | 370/280 |
| 6,094,426 A | * | 7/2000 | Honkasalo et al. ......... | 370/331 |
| 6,094,429 A | * | 7/2000 | Blanchette et al. ......... | 370/347 |
| 6,111,876 A | * | 8/2000 | Frantz et al. ................ | 370/392 |
| 6,175,737 B1 | * | 1/2001 | Kao ............................ | 455/447 |
| 6,256,301 B1 | * | 7/2001 | Tiedemann, Jr. et al. ... | 370/342 |

OTHER PUBLICATIONS

Dunlop et al, Performance of a Statistically Multiplexed Access Mechanism for a TDMA Radio Interface, Jun. 1995, pp. 56–65, IEEE Personal Communications.

Mourot et al, "Low delay data transmission over the ATDMA air interface", 1995, pp 634–638.

Urie, et al, "An advanced TDMA mobile access system for UMTS", Feb. 1995, pp. 38–47, IEEE Personal Communications.

Devile, "A reservation based multiple access scheme for a future universal mobile telecommunications system," Dec. 13–15, 1993, pp. 210–215, IEE Mobile and Personal Communications, Conference Publication No. 387.

* cited by examiner

Primary Examiner—Kwang Bin Yao
Assistant Examiner—Prenell Jones
(74) Attorney, Agent, or Firm—Henry Brendzel

(57) ABSTRACT

An arrangement where, in addition to the control channels that are used to set up sessions, there is a logically and physically separate and independent set of control channels that can be used as session control channels. Illustratively, the physical GSM frame arrangement that employs 8 logical slots is used, with one slot both in the uplink and downlink dedicated to these separate control channels. In the downlink, such a control channel provides channel grant information, requests to make and transmit power measurements, poll mobile units, etc. In the uplink, such a control channel can be used to request access to a traffic channel, to report on power measurements, to request special hand-off handling, to respond to polling, etc. Because the uplink session control channel does not need to carry a significant amount of information, the GSM slot can be divided into minislots, with each minislot constituting a session control channel for a group of mobile units.

22 Claims, 7 Drawing Sheets

MEDIUM ACCESS CONTROL LAYER FOR PACKETIZED WIRELESS SYSTEMS

BACKGROUND OF THE INVENTION

This invention relates to wireless arrangements and, more particularly, to wireless signaling arrangements that employ packet transmissions.

In a conventional cellular network, a mobile unit communicates with a base station system (BSS) over a wireless link. The BSS communicates with a mobile switching center, which together with other mobile switching centers and other BSS comprises the cellular network. The cellular network is connected, in turn, to the public switched telephone network (PSTN).

In a system known as CDPD (Cellular Digital Packet Data), the mobile unit sends its information in packets. The BSS receives these packets and routes them to a data network that is separate from the cellular network. A current proposal for a system known as General Packet Radio Service (GPRS) contemplates having the mobile unit send packets to the BSS, and having the BSS forward the packets to an intelligent router. The router, in turn, sends the packets to the Internet or other packet data networks through a gateway router.

One system specification that is quite pervasive in many countries is GSM (Global System for Mobile communications). GSM employs 20 msec logical frames both in the uplink from mobile to the BSS and in the downlink from BSS to the mobile units. Each logical frame is divided into four physical frames. Each logical frame is also divided into 8 logical time slots. Likewise, each of the physical frames are also divided into 8 physical time slots. The uplink slots are coincident in time with downlink slots, and are numbered so that like-numbered slots (in the uplink and the downlink, respectively) are time shifted by three slots.

The proposed GPRS employs the GSM frame structure.

The GSM signaling specification includes uplink and downlink signaling channels that are used to set up sessions. To access the uplink signaling channel, for example in order to set up a session, mobile units employ random access contention techniques. The signaling channels are designed for circuit switched sessions, but they can also be used for sessions that transmit packets. An essential difference between circuit and packet sessions is that while a circuit involves a continuous activity, a packet session involves bursts of activity. Therefore, in a packet session, it is desirable to relinquish the channel during periods of inactivity and reacquire a channel for a new activity burst.

Alas, access via the call set-up channels is too slow for real time applications. The primary reason why this signaling channel is slow is that the protocol for setting up sessions involves a fair amount of computing and communication overhead. For example, the BSS needs to determine whether the load it is currently handling is low enough to admit a new session, the BSS needs to identify the mobile unit and contact the unit's home base in order to determine the. unit's bona fide, etc. Another reason why this signaling channel is slow is that the number of units that are contending for access on the signaling channel is large, and random access (contention) protocols inherently permit significant delays.

It is desirable to realize an arrangement which enables real time interactivity for packet switched sessions, while efficiently utilizing the available bandwidth. Such an arrangement can enable a variety of services to be offered with widely different Quality of Service requirements, such as packet voice, real-time audio/video, and other real-time applications.

SUMMARY OF THE INVENTION

An advance in the art is realized with an arrangement where, in addition to the control channels that are used to set up sessions, there is another, logically and physically separate and independent set of control channels that can be used as session control channels. Advantageously, such a session control channel is not within the session's traffic-carrying channel and is available during both active sand inactive periods of a session.

In accordance with one illustrative embodiment, the physical GSM frame arrangement that employs 8 logical slots is used, with one slot both in the uplink and downlink dedicated to these separate control channels. In the downlink, such a control channel can be used to provide channel grant information that is broadcast to the relevant mobile, requests to make and transmit power measurements, poll the mobile units, etc. In the uplink, such a control channel can be used to request access to a traffic channel, to report on power measurements, to request special hand-off handling, to respond to polling, etc. Because the uplink session control channel does not need to carry a significant amount of information, the physical GSM slot can be divided into minislots, with each minislot constituting a session control channel for a group of mobile units. In accordance with one embodiment, a mobile unit chooses a particular session control channel and contends, on a random access basis, for access to a traffic channel. In another embodiment, the mobile units are assigned particular session control channels, on a dedicated basis. In still another embodiment, the BSS polls the mobile units via the downlink. When a mobile unit is polled, if it has data to be sent to the BSS, it does so.

DETAILED DESCRIPTION

Figure 1:
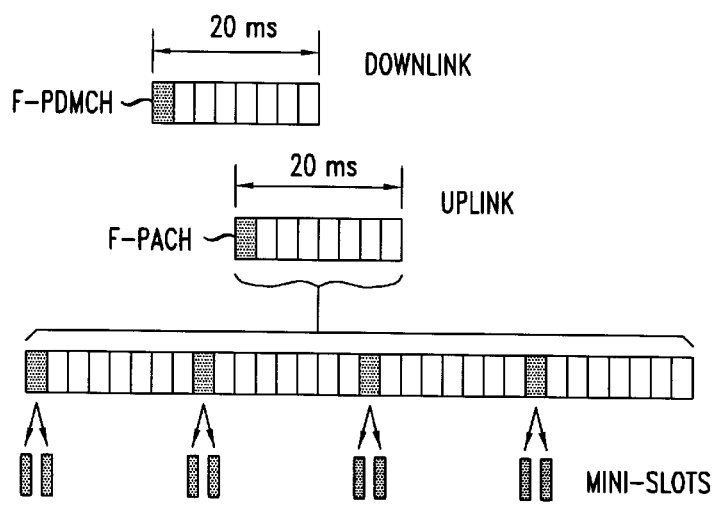
FIG. 1 presents the 8 time slot arrangement of a frame, and the use of one slot for the session control channel; specifically, the fast packet access channel in the uplink, and the fast packet access grant channel and the fast packet polling channel in the downlink.

For purposes of this disclosure, a real-time application is an application which may alternate between active and inactive periods of time and which, when the application returns to the active state, requires access to transmission resources within a relatively short time. A perfect example of a real-time application is packet voice. A mobile unit engaged in a voice session transmits information when the user of the unit is speaking. When the user is silent, the unit has no information to transmit. In a packetized system, it makes sense to stop transmitting packets from a unit that has no information to transmit and to, instead, use the available capacity for packets of other mobile units. Of course, when the user begins speaking again (for example, when the user replies to a question), packets need to be transmitted again, and with relatively little time delay. It is estimated that when switching from an inactive state to an active state of a realtime application, the mobile unit requires to gain access to transmission resources and send out its (e.g., reply) message before 40–60 msec have expired.

The following discloses a Medium Access Control (MAC) layer that enables real-time applications. The illustrative embodiment that is presented relates to a proposed specification known as General Packet Radio Service (GPRS), which is currently in various stages of implementation by a number of telecommunication equipment and service providers. It should be understood, however, that the principles disclosed herein apply to other implementations as well.

Before describing the advance presented in this disclosure some aspects of the GPRS are described.

GPRS employs the general paradigm of the GSM (Global System for Mobile communications) standard, which was launched in 1992 and is now operational in over 300 networks. As described above, the GSM standard employs 20 msec logical frames that are divided into 8 logical time slots. This 20 msec frame is divided into four segments in the physical layer, each of which contains 8 physical time slots. Four of these time-slots combine to provide a logical time-slot in the 20 msec frame. Both the downlink from the base station to mobile units, and the uplink from any mobile unit to the base station use the same frame structure. The time slots of the uplink and the downlink are synchronized to each other but are numbered to provide a time shift of a number of time slots. Specifically, time slot number 1 in the downlink is shifted from time slot number 1 in the uplink by 3 time slots. The downlink signal is at a first set of frequencies. The uplink signals are at a second set of frequencies. The uplink and downlink frequencies are paired, i.e. a particular uplink frequency is associated with a particular downlink frequency, and vice-versa. The term "communication channel" or channel refers to a logical time-slot at a particular frequency. The term "paired channel" refers to the same timeslot at the paired frequency.

The Medium Access Control (MAC) layer in GPRS has the following features to facilitate multiplexing of several data streams in the same set of physical channels.

Establishment of a Temporary Block Flow (TBF) between a mobile unit and the BSS, which is maintained for the duration of the data transfer, e.g. an active period of an ongoing session. A TBF is identified by a Temporary Flow Identifier (TFI, 7 bits in uplink, 5 bits in downlink), which is assigned by the base station and is unique in each direction. A Packet Data Traffic Channel (PDTCH) can simultaneously support more than one TBF. Packets destined for different mobile units (or on the uplink, originating from different mobile units) are distinguished by the attached TFI.

A TBF can be open-ended or close-ended. A close-ended TBF limits the mobile unit to send certain amount of data that has been negotiated between mobile unit and the BSS during initial access. An open-ended TBF is used to transfer an arbitrary amount of data. After completion of the data transfer, the TBF is terminated and the TFI is released.

The use of an Uplink State Flag (USF, 3 bits) in the downlink traffic channel to grant permission to a specific mobile unit to use the corresponding uplink channel in the next frame. The USF is assigned to the mobile unit during initial access. Several mobile units may be allocated to the same physical channel, each with a unique USF. The mobile unit monitors the paired downlink traffic channel. This channel will carry the USF value (even though the downlink data may not be destined to the mobile unit). When the mobile decodes its USF value in the downlink traffic channel, it then uses the corresponding uplink traffic channel in the next frame to transmit data. A single mobile unit with a single TFI can be assigned multiple USFs so it can be supported by multiple physical channels, such as in the case of multi-slot operation.

By using the uplink and downlink TFIs and USF(s), the system can multiplex several data streams on the same set of PDTCHs and a single data stream can be carried over multiple PDTCHs.

The process for gaining access to a traffic channel is initiated in GPRS when a mobile unit first sends a "Packet Channel Request" message to the base station. This message is sent over the Packet Random Access Channel (PRACH). The message indicates the access type or the reason for the access (e.g., data transfer, page response, measurement report, etc.). It does not indicate the identity of the mobile unit or the connection, and with a few exceptions, also does not indicate the amount of data to be transferred by the mobile. After receiving a packet channel request, the base station has to assign TFIs, PDTCHs and USFs to the mobile unit before any data transfer can commence.

Once assigned, the BSS sends a "packet uplink assignment" message, broadcasted to the mobile units via the Packet Access Grant Channel (PAGCH). The PRACH and PAGCH are common control channels that are typically located on time slot 0 of the PCCCH (Packet Common Control Channel) carrier. The PCCCH employs a specified pair of frequencies (for the uplink and the downlink) and is both physically and logically separate from the GSM frames discussed above.

The invention disclosed herein begins with the observation that such elaborate access procedures are unnecessary and unsuitable for access during an ongoing session. For a mobile unit with an established TFI, it is far more efficient for the mobile unit to just transmit this TFI to the base station in order to identify itself and to regain access to the network.

In addition, to enable real-time services using GPRS, it is necessary to enhance the current state of the art to provide the following capabilities:

Fast uplink access during an ongoing session;

Fast resource assignment for both uplink and downlink;

The ability to integrate different services on the same physical channels.

In accordance with the principles disclosed herein, the desired improvements in GPRS are achieved with a new set of control channels. The control channels are not in the packet traffic channel (sometimes referred to as "out of band"), and are also physically and logically separate from, and in addition to, the set of control channels described so far, which comprise the PCCCH.

For the uplink, the new control channel includes the Fast Packet Access Channel (F-PACH) and, optionally, other control channels. For the downlink, the new control channel includes the Fast Packet Access Grant Channel (F-PAGCH)—in one of the embodiments described herein, or the Fast Packet Access Grant Channel (F-PAGCH) and the Fast Packet Polling Channel (F-PPCH)—in another of the embodiments described herein. Other control channels are also possible to be included in the F-PAGCH. These channels can be located on a specific time slot (e.g., time slot 0) of some selected carrier frequencies and their purpose is to support real-time applications. Each pair of F-PACH and F-PAGCH/F-PPCH may carry the fast uplink access, access grant, polling and polling response messages for a set of carrier frequencies. The proposed structures of these channels are shown in FIG. 1.

The structure of F-PACH is similar to that of the normal PRACH in GPRS, in the sense that messages are transmitted in individual bursts (physical time slot discussed earlier). Logically, the difference between the two is that the PRACH is used to carry channel access requests for initial access, i.e., to set up sessions, whereas the F-PACH is used primarily for ongoing sessions. Physically, the difference between the two is that the PRACH is used for a more complex task and is, therefore, necessarily slower, whereas the F-PACH is much more streamlined and, consequently, faster. Therefore, rather than being a plain initial access request in which no user information is included, the fast access request messages carried in F-PACH contain information on the specific TBF being referenced, i.e., the uplink TFI assigned to the mobile unit and the application. Based on this information, the base station can uniquely identify the mobile unit and the specific application and therefore quickly assign the necessary uplink resource to the mobile unit.

In addition, unlike for the PRACH, the mobile unit does not need an extended synchronization sequence or an extended guard period when using the F-PACH. This is because F-PACH is used during a session, and therefore the mobile unit has recent timing advance information. Hence, the length of a Fast Access Burst (F-AB), i.e., a burst on the F-PACH, can be less than that of a normal AB. Indeed, the F-AB can be half of a GSM time slot, allowing two Fast Access Bursts to be accommodated within a GSM time slot. Thus, a GSM time slot can be divided into two minislots. Actually, the F-PACH may be defined using either a normal GSM time-slot or a mini-slot. Using a mini-slot format requires a change in the physical channel structure of current GSM; however, it doubles the F-PACH capacity. Using a full time-slot for F-PACH channel needs no modification in the physical channel structure, but it may require additional resources (channels) to be assigned to the F-PACH to support the same number of traffic channels.

Figure 2:
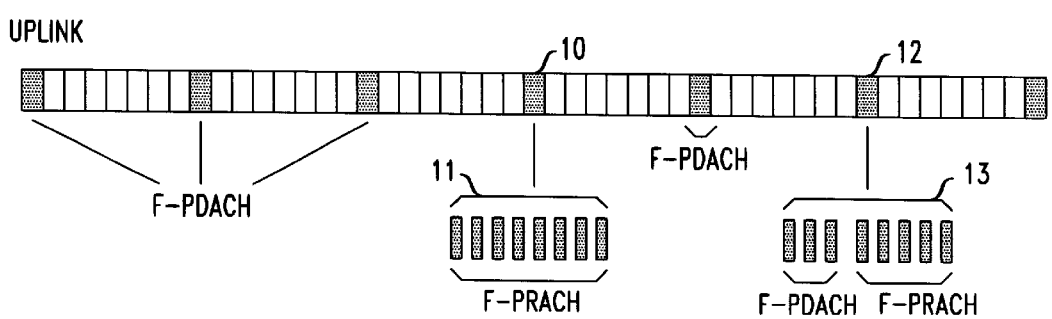
FIG. 2 illustrates that the eight physical minislots of an uplink session control channel can be used in different ways.

The Fast Packet Access Channel can be used as a Fast Packet Random Access Channel (F-PRACH) or as a Fast Packet Dedicated Access Channel (F-PDACH). In fact, F-PRACH and F-PDACH can be time multiplexed on the same physical channel. This is shown in FIG. 2, where one logical F-PACH time slot (10) is shown to have eight (physical) minislots that comprise eight F-PRACHs (grouping 11), and another F-PACH time slot (12) is shown to have eight (physical) minislots that comprise three F-PDACHs and five F-PRACHs (grouping 12). The provisioning of these channels can be specific to the BSS, and determined by the traffic currently served by the BSS.

In connection with dedicated access, the F-PDACH can be either fixedly or dynamically assigned. When fixedly assigned, the F-PDACH is assigned to the mobile unit at the beginning of the call and maintained until the end of the call. A dynamically assignable F-PDACH is assigned to the user on an as-needed basis.

While the F-PDACH is designed to be used for obtaining fast access, as suggested above it can serve purposes other than fast access, such as:

Transmitting measurement reports for Mobile Assisted Handoff (MAHO) and power control;

Timing information;

A tracking signal for implementing smart antennas;

To transmit comfort noise or a keep alive signal to the base station;

If the F-PDACH is used primarily for access requests, it is possible to design a message format that requires fewer bits, because the BSS already knows which mobile unit or set of mobile units is assigned to each F-PDACH. Therefore, the access request need only identify which mobile unit is making the request. For example, each mobile unit may be assigned one out of a set of orthogonal Walsh codes, which it transmits as its access request. Thus, several mobile units may concurrently use the same time-slot for access. This can significantly increase the fast access capacity.

The downlink channel corresponding to the F-PACH serves as a fast downlink packet control channel (F-PCCH). Corresponding to the request for access on the uplink, there is the fast packet grant channel on the downlink. The downlink channel can be also used to transmit control messages to mobile units with ongoing sessions. If a mobile unit has an ongoing downlink data transfer, it is also possible (and maybe even preferable) to use the Packet Associated Control Channel (PACCH) to transmit these messages (i.e., within the channel that carries packet traffic; sometimes referred to as "inband" control). However, if this is not the case, the base station uses the F-PCCH to communicate with the mobile unit. Mobile units with ongoing sessions that do not have an ongoing downlink data transfer, camp on the F-PCCH, i.e. look for control messages on the F-PCCH. Thus, the base station can use this channel to transmit current access settings, requests for power measurements, or other common control messages to the camped mobile unit.

Finally, in addition to optionally having some selected control channels, the Fast Packet Access Grant Channel (F-PAGCH), the F-PCCH provides for a Fast Packet Polling Channel (F-PPCH). These channels can be time multiplexed on the same physical channel. As suggested above, the F-PAGCH is used to respond to access requests on the F-PACH. The F-PPCH is used to poll different mobile units, e.g., for access queries or for measurement reports. As for the uplink, the provisioning of these channels can be BSS-specific, and determined by the current traffic requirements of the BSS.

The above descriptions of the F-PACH and F-PAGCH/F-PPCH are based on full-rate channels, i.e., using four GSM bursts in every 20 msec frame. For efficient real-time multiplexing, a mobile unit may be required to communicate (i.e., camp on or transmit messages on) on these control channels while also having an ongoing data transfer on other time-slots. This would normally imply that the mobile unit has both a multi-slot capability and a duplexer.

In order to minimize the requirements imposed on mobile unit terminals, the following outlines two control channel configurations that obviate the need for a duplexer, and minimize the requirement for a multi-slot capability.

Figure 3:
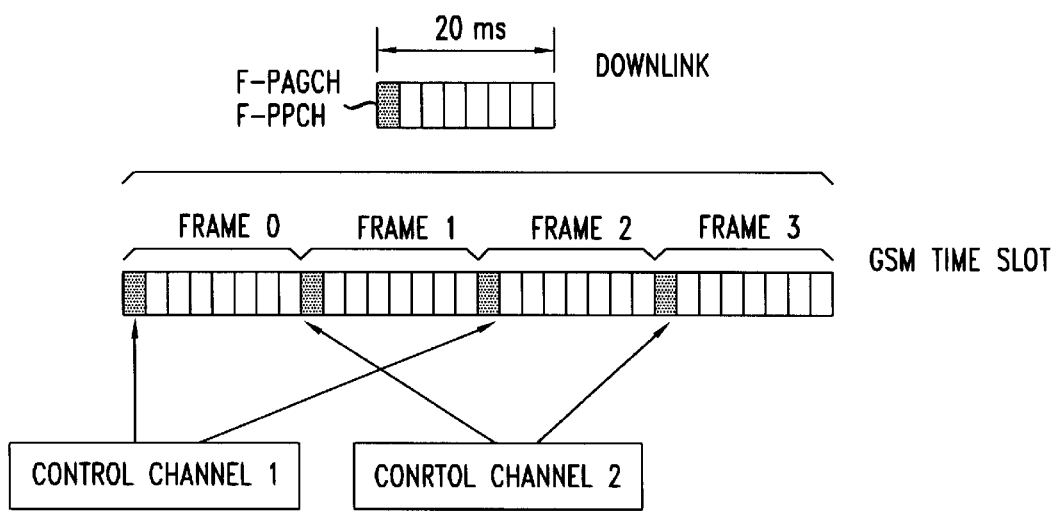
FIG. 3 shows one way to employ half rate control.

The first configuration is proposed to support single slot terminals or terminals without a duplexer. For this configuration to work, terminals should have a half-rate capability, e.g., packet voice using a half-rate codec. The service would then require only two bursts every 20 msec. The idea is that rather than using a full-rate control channel, the system uses two half-rate control channels. For instance, as shown in FIG. 3, one control channel resides on time slot 0 of frames 0 and 2, a second control channel resides on time slot 0 of frames 1 and 3, and so on. As a result, a single-slot terminal can communicate on the control channel on frames 0 and 2, and have ongoing data transfers during any time slot i on frames 1 and 3.

Figure 4:
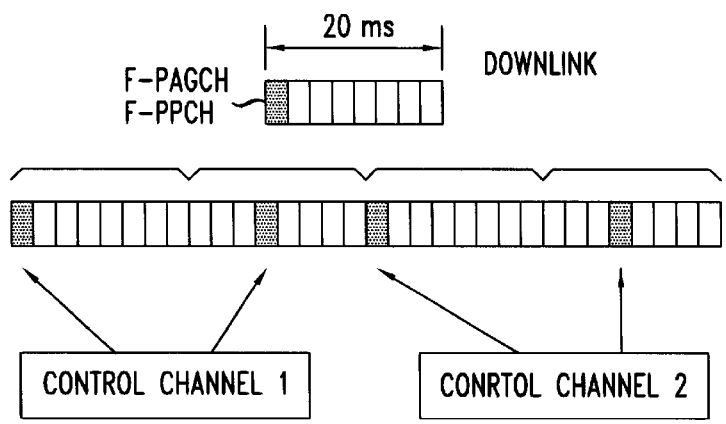
FIG. 4 shows a time-shifted way to employ half rate control.

FIG. 4 presents another example. It shows two half-rate channels as in FIG. 3 but, unlike the assignment in FIG. 3, these two sets of channels are assigned to different time-slots. The first set of half-rate F-PACH and F-PAGCH/F-PPCH is assigned to time slots 0 of frames 0 and 2, and the second set is assigned to time slots 3 of frames 1 and 3. The system thus has 2 sets of channels for both downlink and uplink, separated by two time-slots. A mobile unit would use a control channel that is most compatible with its current traffic channel assignment, obviating the need for a duplexer, i.e., for a mobile unit to receive and transmit at the same time.

To summarize, the new MAC with the F-PACH and F-PAGCH/F-PPCH common control channels offers three options for fast access:

Contention-based random access

Dedicated access channel

Out-of-band polling

A combination of these techniques may be used to design suitable access protocols.

The following provides three examples of uplink access protocols. The first one combines random access and dedicated access, the second one uses pure random access and the third one uses out-of-band multi-user polling to schedule fast access. The protocols consider three types of services in the system: (1) best-effort data, (2) delay-sensitive data, and (3) real-time applications, with an increasingly tighter delay requirement. We also assume that each data call alternates between active and quiescent states, e.g., a voice call alternates between talk-spurts and silent gaps.

The overall access procedure for a "real-time" application, which is common to all protocols, consists of the following:

1. Initial access: The basic MAC procedure is used, employing the regular PRACH to obtain TFI and USFs. These assignments are granted through the regular PAGCH. An "open-ended" TFI is requested for real-time and delay-sensitive applications.
2. Ongoing Session Access: At the beginning of an active period, the fast uplink access mechanism is used to access the channel, while maintaining the same TFI. The access is done through F-PACH and the assignment is granted through F-PAGCH. As indicated earlier, both are logically distinct from the PRACH and the PAGCH.
3. While in a quiescent (inactive) state, the mobile unit may be required to listen to the F-PPCH and respond to polling messages sent by the base station. This could be used by the base station, for example, to solicit measurement reports, or to solicit the start of an active session. The mobile unit responds using the F-PACH, either using the F-PRACH, or the F-PDACH (in cases where the mobile unit is assigned an F-PDACH).

Protocol 1: Combined Random Access and Dedicated Access

Figure 5:
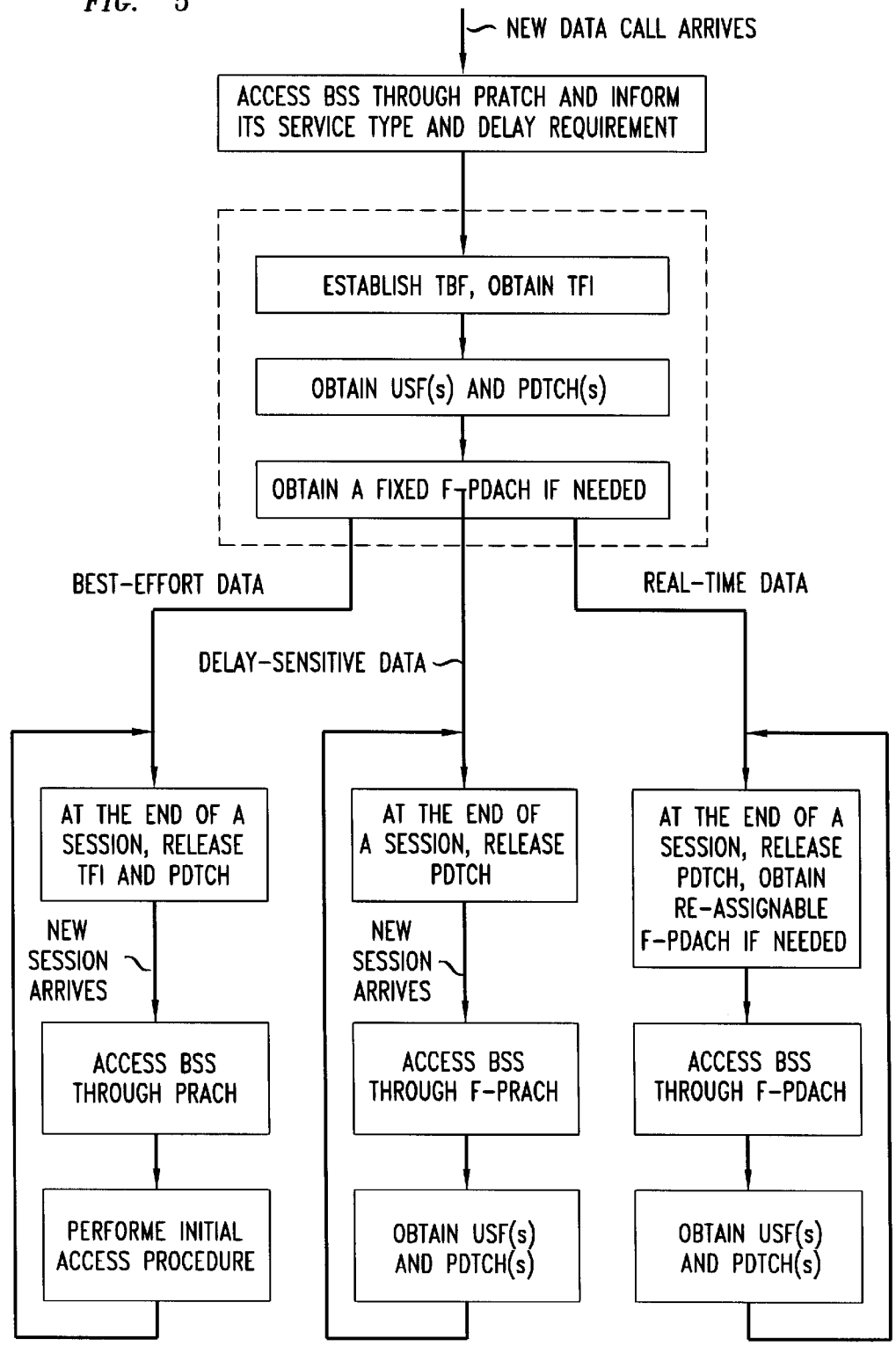
FIG. 5 illustrates a first protocol in accord with the principles of this invention.

The first protocol, shown in FIG. 5, uses combined random access and dedicated access. An exemplary uplink access procedure is as follows:

When a new data call starts, at block 100 the mobile unit uses the normal PRACH to access the system. As part of the initial access procedure, the BSS establishes TBF and assigns TFI and USFs in block 101, and assigns the traffic channel(s)—PDTCHs—in block 102. If it is a request for a real-time application, a fixed F-PDACH can also be obtained, if necessary, by block 103.

When the data call ends a session,

For best-effort data, in block 104 the mobile unit releases its TFI, USFs and PDTCHs.

For delay-sensitive data, in block 111 the mobile unit maintains its TFI but releases its USFs and PDTCHs.

For real-time data, in block 107 the mobile unit maintains its TFI but releases its USFs and PDTCHs, as in the case of delay-sensitive data and, in addition, if necessary, it is assigned a new F-PDACH through the Packet Associate Control Channel (PACCH) or F-PAGCH (before the PDTCHs are released).

At the beginning of the next session,

For best-effort data, in block 105 the mobile unit goes through the entire PRACH access procedure, and performs the initial access procedure.

For delay-sensitive data, in block 112 the mobile unit accesses the system through F-PRACH. When access is re-gained, in block 113 the mobile unit obtains new USFs and PDTCHs.

For real-time application, in block 108 the mobile unit accesses the system through either fixed F-PDACH or re-assignable F-PDACH. When access is re-gained, in block 109 the mobile unit obtains new USFs and PDTCHs, and in block 110 the re-assignable F-PDACH is released.

Figure 6:
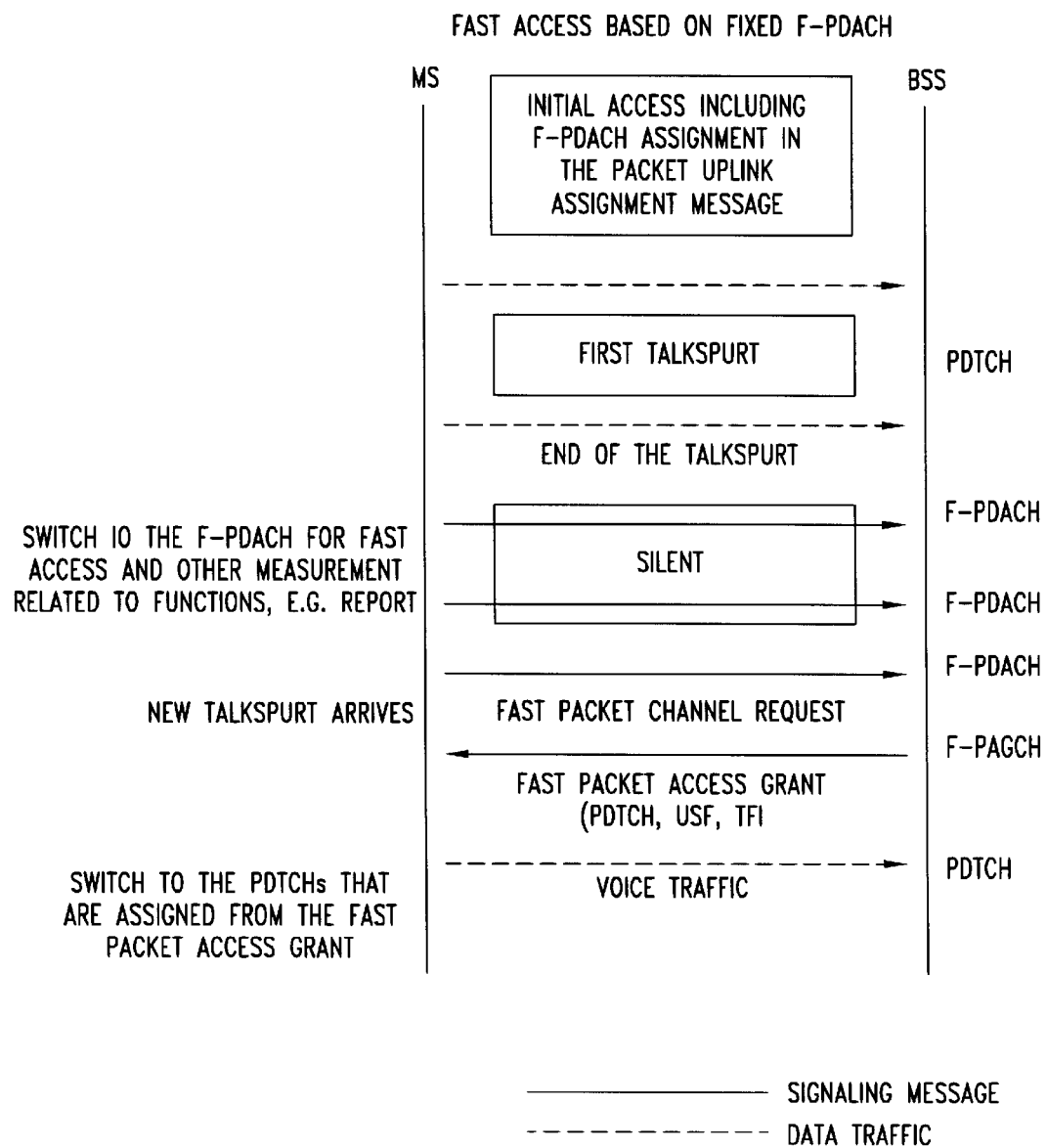
FIG. 6 presents the message flow for real-time applications for a fixed fast packet dedicated access channel in accordance with the first protocol.

FIG. 6 shows the fast uplink access process with a fixed F-PDACH for a voice session that has silent, or inactive periods.

1. At the initial access, the mobile unit obtains the TFI, USF(s), and PDTCH(s), and because this is a voice session, which is a real-time application, block 103 also obtains a F-PDACH; in this example, a fixed F-PDACH.
2. During the active talk period, the mobile unit transmits over the assigned packet data traffic channel, or channels (PDTCH(s)).
3. When the user of the mobile unit enters a silent period, the mobile unit releases its PDTCH but maintains its F-PDACH.
4. During the silent period, mobile unit switches to the F-PDACH and transmits whatever information is desired, such as measurement report, over this channel.
5. When the inactive period ends and the user of the mobile unit begins to speak again, the mobile unit informs the base station of this fact through F-PDACH, using fast access burst (F-AB), with the "Fast Packet Channel Request" message. The base station assigns a PDTCH together with its assigned USF to the mobile through F-PAGCH, and the speech packets are then transmitted.

Figure 7:
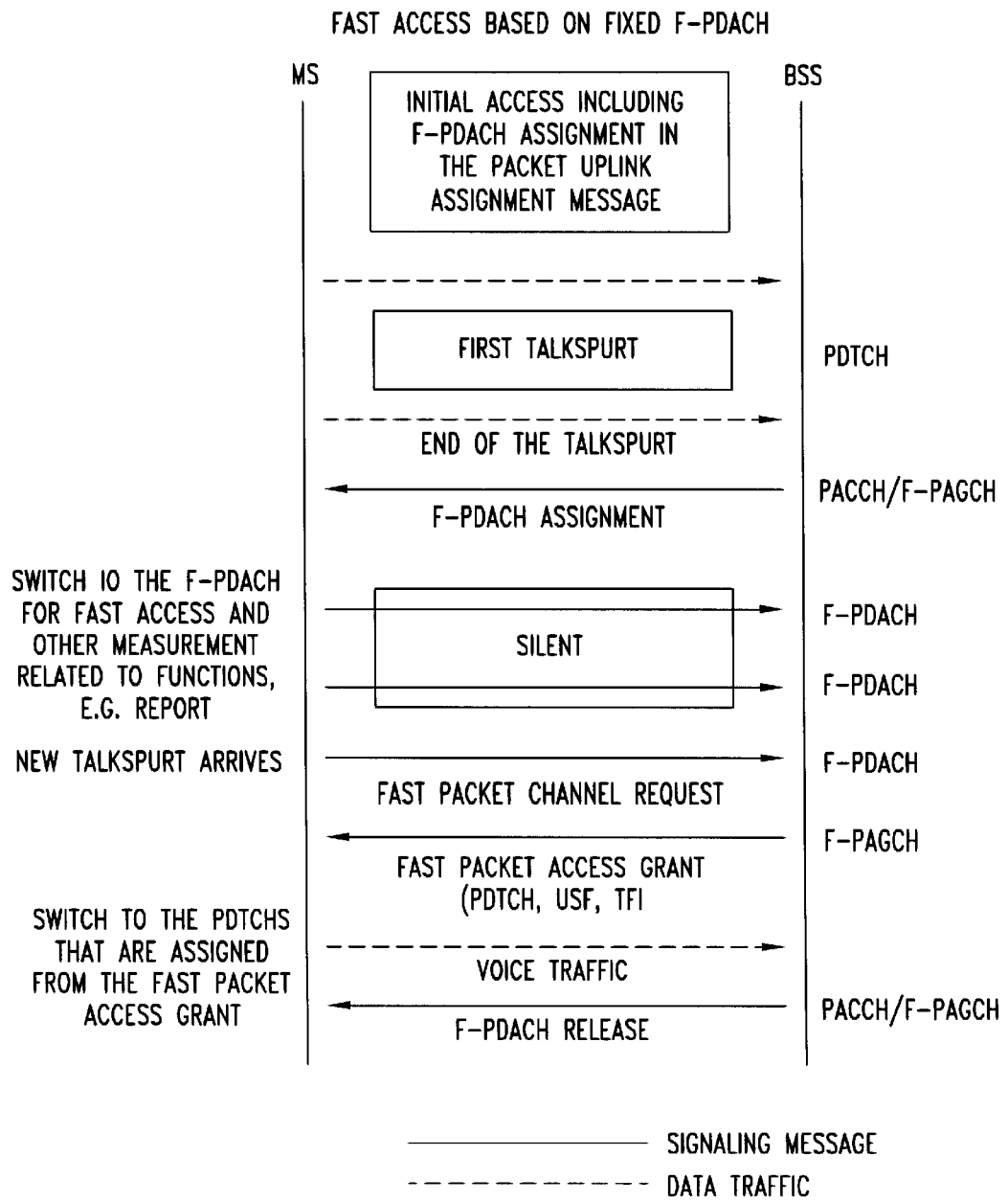
FIG. 7 presents the message flow for real-time applications for a re-assignable fast packet dedicated access channel in accordance with the first protocol.

FIG. 7, which shows the fast uplink access process with a re-assignable F-PDACH for a voice session that has silent, or inactive periods, is similar to FIG. 6. Specifically, 1. At the initial access, the mobile unit obtains TFI, USF(s), and corresponding PDTCH(s).
2. During the active talk period, the mobile unit transmits at the assigned PDTCH.

3. When the user of the mobile unit enters a silent period, the mobile unit is assigned an F-PDACH through the PACCH or F-PAGCH, and then releases its PDTCH.

4–5. The same as in FIG. 6.

6. Release re-assignable F-PDACH.

Protocol 2: Complete Random Access

Figure 8:
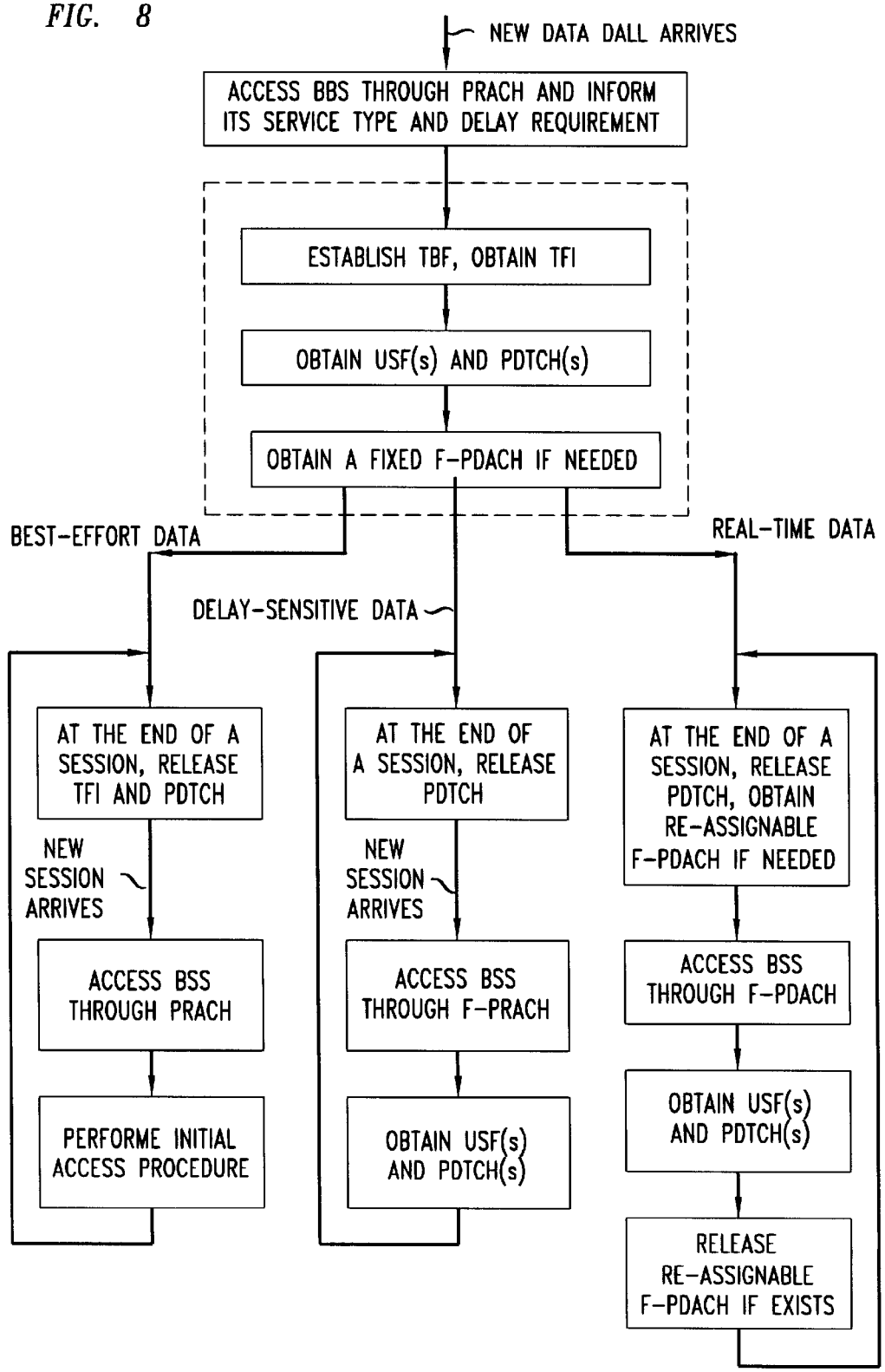
FIG. 8 illustrates a second protocol in accord with the principles of this invention.

In this protocol, all the F-PACH capacity is allocated for F-PRACH. Therefore, all the fast uplink access requests go through F-PRACH. To differentiate services with different delay requirements, each type of service is associated with its own access probability and priority level and may use a different access procedure. An exemplary access procedure is shown in FIG. 8.

When a new data call starts, in block 200 the mobile unit uses the normal PRACH to access the system. From the initial access procedure, in block 201 it establishes TBF and obtains TFI, and in block 202 it obtains USF(s) and PDTCH(s). In block 203 the mobile unit obtains access probabilities, if needed.

At the end of a session,

For best-effort data, in block 204 the mobile unit releases its TFI, USF(s) and PDTCH(s).

For delay-sensitive (or real-time data), in block 205 (or block 206) the mobile unit maintains its TFI but releases its USF(s) and PDTCH(s).

At the beginning of a next session,

For best-effort data, in blocks 207 and 208 the mobile unit goes through the entire PRACH access procedure.

For delay-sensitive data, in block 209 the mobile unit accesses the system through F-PRACH with its pre-determined access probability and access procedure.

For real-time application, mobile unit accesses the system through F-PRACH with its pre-determined access probability and access procedure.

Figure 9:
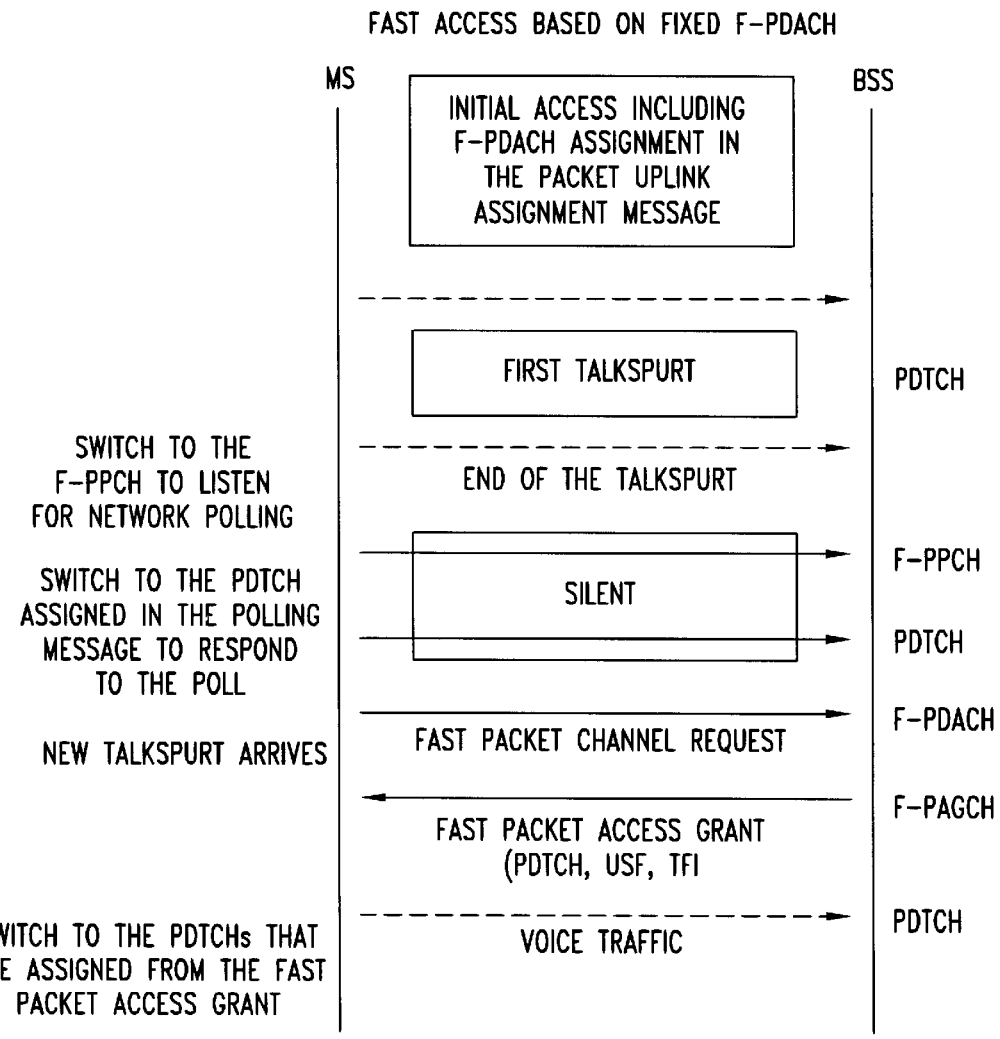
FIG. 9 presents the message flow for real-time applications using fast packet random access channel in accordance with the second protocol.
Figure 10:
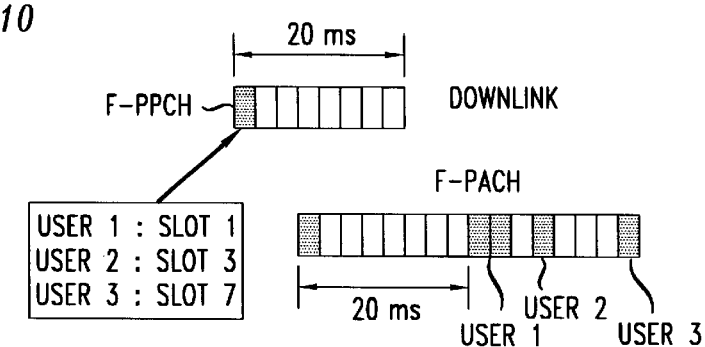
FIG. 10 illustrates group polling in the context of this invention.

The message flow for fast uplink access through F-PRACH is shown in FIG. 9, and is very similar to FIGS. 6 and 7, except that during a silent period, the mobile switches to the F-PPCH to listen for network polling. The base station will poll multiple users, using TFIs as identifiers, for any information such as measurement reports for power control, smart antenna, and so on. For each polled TFI, a PDTCH and USF are assigned. The mobile then switches to the corresponding downlink PDTCH and looks for its USF value. When the USF value is present, the mobile transmits the polling response in the corresponding uplink PDTCH. The polling schedule is determined by the base station and is illustrated in FIG. 10.

Protocol 3: Out-Of-Band Polling

The current GPRS specification permits the system to implement a fast uplink access based upon in-band polling via USF. However, it is believed that the use of in-band polling to solicit on-going session access cannot meet the delay requirement for real-time applications while achieving efficient statistical multiplexing. Therefore, out-of-band polling is disclosed herein, using the newly disclosed control channels: F-PACH and F-PAGCH/F-PPCH.

In this scheme, the base station determines the polling schedule and sends the polling message through F-PPCH. Multiple users can be polled simultaneously. The polling response from each user, i.e., the access request, is sent through F-PACH (burst or mini-burst) without any contention, or with limited contention. Upon receiving the access request, resources can be assigned to users through F-PAGCH. This polling access procedure is illustrated in FIG. 10.

Base station sends a polling message via F-PPCH to poll a group of users when necessary. In FIG. 10, it is users 1, 2, and 3. The polling message also specifies an "uplink access sequence". For instance, the first user may use the first F-PACH burst, the second user may use the second burst, and so on.

To respond, each of the users being polled sends an access request through the pre-determined F-PACH, if it has anything to transmit.

The assignment is granted in the next frame through F-PAGCH.

The number of users that can be polled in each message may be determined by structure of the F-PPCH and F-PACH. For instance, assume that one block is used for each F-PPCH, which is very similar to the GSM paging messages used at present. Also assume that the base station needs to ensure that there are no collisions in the responses on the F-PACH. Then, if one F-PACH occupies one GSM burst, four users can be polled in one 20 ms frame. If one F-PACH occupies half a burst, eight users can be polled every time. The capacity may be increased by assigning a specific code, e.g., a Walsh code, to each of the polled users.

What is claimed is:

1. A method for a mobile unit to communicate with a base station over a wireless medium comprising the steps of:

sending a call set-up request message to the base station over a first control channel between said mobile unit and said base station, for said base station to enable two-way packet communication between said mobile unit and said base station over a traffic channel, receiving information pertaining to a session control channel, established by said base station, that is logically distinct from said first control channel and also physically and logically distinct from said traffic channel, and said mobile unit sending a request over said session control channel for access to said traffic channel for said session to enable said mobile unit to send said packet traffic to said base station over said traffic channel, where said request identifies the call that requests a packet traffic channel by a traffic flow identifier that was provided to said mobile unit over said first control channel.

2. A method for a mobile unit to communicate with a base station over a wireless medium comprising the steps of:

sending a call set-up request message to the base station over a first control channel between said mobile unit and said base station, for said base station to enable two-way packet communication between said mobile unit and said base station over a traffic channel, and receiving information pertaining to a session control channel, established by said base station, that is logically distinct from said first control channel and also physically and logically distinct from said traffic channel, where said information regarding a session control channel informs said mobile unit that in order to gain access to said session control channel said mobile unit is to employ a random access protocol.

3. A method for a mobile unit to communicate with a base station over a wireless medium comprising the steps of:

sending a call set-up request message to the base station over a first control channel between said mobile unit and said base station, for said base station to enable two-way packet communication between said mobile unit and said base station over a traffic channel, and receiving information pertaining to a session control channel, established by said base station, that is logically distinct from said first control channel and also physically and logically distinct from said traffic channel, where said information regarding a session control channel informs said mobile unit that in order to gain access to said session control channel said mobile unit is to employ a contention-based protocol.

4. A method for a mobile unit to communicate with a base station over a wireless medium comprising the steps of:
sending a call set-up request message to the base station over a first control channel between said mobile unit and said base station, for said base station to enable two-way packet communication between said mobile unit and said base station over a traffic channel, and receiving information pertaining to a session control channel, established by said base station, that is logically distinct from said first control channel and also physically and logically distinct from said traffic channel, where said information regarding a session control channel fixedly assigns a fast-packet data access channel, over which said mobile unit can request fast access for a traffic channel, that is valid for duration of said call.

5. A method for a mobile unit to communicate with a base station over a wireless medium comprising the steps of:
sending a call set-up request message to the base station over a first control channel between said mobile unit and said base station, for said base station to enable two-way packet communication between said mobile unit and said base station over a traffic channel, and receiving information pertaining to a session control channel, established by said base station, that is logically distinct from said first control channel and also physically and logically distinct from said traffic channel, where said information regarding a session control channel dynamically assigns a fast-packet data access channel, over which said mobile unit can request fast access for a traffic channel, that is valid until said mobile unit enters a state in which a packet traffic channel from said mobile unit to said base station is relinquished.

6. The method of claim 4 further comprising a step of receiving control information over said session control channel.

7. The method of claim 1 further comprising a step of receiving control information over said session control channel, and said mobile unit analyzing whether control information received in said step of receiving is a packet traffic channel grant message or some other control message from a preselected set of control messages.

8. The method of claim 1 further comprising a step of sending packet data over said traffic channel when said control information corresponds to a packet traffic channel grant message.

9. The method of claim 8 where, in response to an end of a session, said mobile unit proceeds with different actions, based on whether said session is a "best effort" data communications session, a delay-sensitive data communications session, or a real-time communications application.

10. The method of claim 9 where said different actions also depend on whether access by said mobile unit to said session control channel is via a random access protocol, a fixed dedicated channel, or a dynamically assignable dedicated channel.

11. The method of claim 1 further comprising a step of receiving a polling message from said base station over said session control channel.

12. The method of claim 11 where said polling message requests power measurement information.

13. The method of claim 11 further comprising a step of sending information in response to said polling message.

14. The method of claim 13 where said information in response to said polling message is a request for a traffic channel.

15. The method of claim 11 further comprising a step of sending information in response to said polling message only when information responsive to said polling message is available.

16. A method for a mobile unit to communicate with a base station over a wireless medium comprising the steps of:
sending a call set-up request message to the base station over a first control channel between said mobile unit and said base station, for said base station to enable two-way packet communication between said mobile unit and said base station over a traffic channel, and receiving information pertaining to a session control channel, established by said base station, that is logically distinct from said first control channel and also physically and logically distinct from said traffic channel, where said communication is passed by said medium in frames said session control channel is positioned in one or more channels of said frames, each frame having N logical channels, where N is an integer, and other logical channels of said N logical channels are used for packet traffic channels.

17. The method of claim 16 where said one or more channels are one or more time slots, and said N channels are N time slots.

18. The method of claim 16 where said one logical channel is divided into two minislots, and each of said minislots is available for sending control messages.

19. The method of claim 16 where said mobile unit interacts over said session control channel and, concurrently, is participating in an ongoing data transfer over a packet traffic channel.

20. The method of claim 16 where said mobile unit is adapted to interact over said session control channel during said one or more channels of other than consecutive frames, and to interact over a packet traffic channel of other than consecutive frames, where said other than consecutive frames for interaction over said session control channel are distinct from said other than consecutive frames for interaction over said packet traffic channel.

21. A method for a mobile unit to communicate with a base station over a wireless medium comprising the steps of:
sending a call set-up request message to the base station over a first control channel between said mobile unit and said base station, for said base station to enable two-way packet communication between said mobile unit and said base station over a traffic channel, and receiving information pertaining to a session control channel, established by said base station, that is logically distinct from said first control channel and also physically and logically distinct from said traffic channel, where said session control channel is positioned in one logical time slot of other than consecutive frames having N logical time slots, where N is an integer and in another logical time slot in other frames, where other logical time slots of said N logical time slots are used for packet traffic channels.

22. The method of claim 21 where said mobile unit is adapted to select whether to interact over said session control channel during said one logical time slot of alternating frames, or during said another logical time slot in other frames.

* * * * *